(12) United States Patent
Van Der End et al.

(10) Patent No.: US 12,356,998 B2
(45) Date of Patent: Jul. 15, 2025

(54) SYSTEM AND METHOD FOR TRANSFERRING POULTRY LEGS

(71) Applicant: Foodmate B.V., Numansdorp (NL)

(72) Inventors: Maarten Jeroen Van Der End, Dordrecht (NL); Adriaan Hendrik De Koning, Zuid-Beijerland (NL)

(73) Assignee: Foodmate B.V., Numansdorp (NL)

( * ) Notice: Subject to any disclaimer, the term of this patent is extended or adjusted under 35 U.S.C. 154(b) by 0 days.

(21) Appl. No.: 18/700,159

(22) PCT Filed: Oct. 12, 2022

(86) PCT No.: PCT/NL2022/050583
§ 371 (c)(1),
(2) Date: Apr. 10, 2024

(87) PCT Pub. No.: WO2023/063823
PCT Pub. Date: Apr. 20, 2023

(65) Prior Publication Data
US 2024/0415132 A1   Dec. 19, 2024

(30) Foreign Application Priority Data
Oct. 12, 2021   (NL) .................................... 2029381

(51) Int. Cl.
*A22C 21/00*   (2006.01)
(52) U.S. Cl.
CPC ...... *A22C 21/0053* (2013.01); *A22C 21/0007* (2013.01); *A22C 21/0046* (2013.01)
(58) Field of Classification Search
CPC ............ A22C 21/0053; A22C 21/0007; A22C 21/0046; B65G 17/485; B65G 2201/0202

USPC .......................................................... 452/182
See application file for complete search history.

(56) References Cited

U.S. PATENT DOCUMENTS 5,453,045 A * 9/1995 Hobbel ............... A22C 21/0053
452/183
2014/0024302 A1 * 1/2014 Aandewiel ......... A22C 21/0053
452/182

FOREIGN PATENT DOCUMENTS

EP          0736255          10/1996

OTHER PUBLICATIONS

International Search Report in PCT/NL2022/050583 dated Dec. 19, 2022.

* cited by examiner

*Primary Examiner* — Richard T Price, Jr.
(74) *Attorney, Agent, or Firm* — Michael Best & Friedrich LLP

(57) ABSTRACT

A system and method for transferring poultry legs from a supply conveyor to a discharge conveyor. The poultry transfer unit comprises a transfer body configured for continuously moving. The poultry transfer unit comprises at least one carrier engaging to the transfer body, such that the at least one carrier in a transporting mode moves along with the transfer body and in a buffering mode moves relative to the transfer body. The at least one carrier comprises a gripper for receiving the poultry leg. The at least one carrier further comprises resistance means having a rotor and a stator, wherein the rotor is driven by a motion of the carrier relative to the transfer body, and wherein the stator is stationary with respect to the carrier.

20 Claims, 7 Drawing Sheets

SYSTEM AND METHOD FOR TRANSFERRING POULTRY LEGS

FIELD OF THE INVENTION

The present invention relates to a system and method for transferring poultry legs. In particular, the invention relates to a system and method for transferring poultry legs from a supply conveyor to a discharge conveyor. In particular, the invention relates to a system and method for transferring poultry legs from a supply conveyor to a discharge conveyor using a transfer body.

BACKGROUND TO THE INVENTION

Poultry transfer systems are generally used for moving poultry and/or poultry parts between two or more poultry handling devices. These poultry handling devices are known to be used for poultry transportation, processing and/or packaging. Various poultry handling devices can be configured to handle the poultry in a relatively different position or velocity or requiring a different spacing between the poultry parts. Unsuitably configured poultry parts that are transferred to a poultry handling device may cause a problem in terms of poultry to be positioned incorrectly, or the poultry handling device to malfunction or the like.

Also, it is not always desired that all poultry parts are handled by the same handling devices and/or in the same order. All poultry parts being handled by the same handling devices may cause a decreased efficiency and/or decreased harvest of the overall poultry transportation, processing and/or packaging system.

SUMMARY OF THE INVENTION

It is an object to provide a poultry transfer unit for transferring poultry legs, and/or a method for transferring poultry legs, that obviates, or at least diminishes the disadvantages mentioned above. In general, it is an object to provide an improved poultry transfer system and/or method for transferring poultry legs from a supply conveyor to a discharge conveyor.

Thereto, according to a first aspect, a poultry transfer unit for transferring poultry legs from a supply conveyor to a discharge conveyor is provided. The poultry legs can be part of a carcass or partial carcass, such as a saddle, e.g. a poultry part including two legs. The poultry transfer unit is optionally arranged to transfer poultry parts and/or poultry carcasses. The poultry transfer unit comprises a transfer body configured for continuously moving, such as rotationally moving. The transfer body can comprise a disc and a sprocket, e.g. connected concentrically. The poultry transfer unit further comprises at least one carrier engaging to the transfer body, such that the at least one carrier in a transporting mode moves along with the transfer body and in a buffering mode moves relative to the transfer body. The at least one carrier comprises a gripper for receiving the poultry leg. Empty carriers as well as carriers holding a poultry leg can be buffered, e.g. arranged in the buffering mode. The at least one carrier further comprises resistance means having a rotor and a stator, wherein the rotor is driven by a motion of the carrier relative to the transfer body, and wherein the stator is stationary with respect to the carrier. It will be appreciated that tests can be performed to determine the amount of resistance force required for the resistance means in the different modes. The resistance force can be created by induction, the force generated by movement of a fluid, and/or other types of force generation having the required resistance. The resistance force can be at least partially generated by mechanical brakes.

Optionally, the transfer body comprises a driver for driving the rotor. In embodiments, the driver can be a sprocket, a friction wheel, a magnetic drive, or the like. Optionally, the transfer body comprises a sprocket and the carrier comprises a gear arranged to engage the sprocket, wherein the gear drives the rotor. The sprocket can comprise an annular sprocket. The sprocket can extend along a circumferential track of the transfer body. Optionally, the transfer body comprises a first friction wheel and the carrier comprises a second friction wheel arranged to engage the first friction wheel, wherein the second friction wheel drives the rotor. Optionally, the transfer body comprises a plurality of magnetic elements and the carrier comprises a magnetic element arranged to engage with the magnetic elements of the transfer body, wherein the magnetic element of the carrier drives the rotor. The rotor of the carrier can be directly or indirectly driven by the transfer body.

Optionally, the transfer body comprises an annular guide track for guiding the carriers and an annular sprocket engaging the gear. Optionally, the annular sprocket is fixedly mounted to, or integral with, the guide track so that the annular sprocket co-rotates with the guide track when the transfer body rotates. Optionally, the guide track and the annular sprocket rotate at mutually different speeds. Optionally, the guide track is stationary and the annular sprocket rotates.

Optionally, the rotor is arranged to induce eddy currents in the stator and/or the stator is arranged to induce eddy currents in the rotor in the buffering mode. Hence, a resistance force is generated when the rotor rotates relative to the stator, e.g., when the carrier moves relative to the transfer body.

Optionally, the resistance means are configured to provide a non-zero resistance between stator and rotor when there is no velocity difference between the at least one carrier and the transfer body, e.g. in the transporting mode.

Optionally, the stator and the rotor comprise complementary magnetic means. One of the stator and rotor has preferably permanent magnets, whereas the other one comprises a magnetizable material.

Optionally, the stator has permanent magnets and the rotor is made of aluminum. The magnetizable material can be implemented in the form of inserts, such as pins, in the rotor. The number of pins can be equal to the number of magnets, such as 8, 12, 16, 20, 24 or 30 magnets.

Optionally, the poultry transfer unit further comprises a buffer release means for controlling releasing of a carrier from buffering. The buffer release means can be configured to determine the timing for releasing carriers.

Optionally, the buffer release means are configured for selectively holding one or more carriers in the buffering mode or releasing one or more carriers to the transporting mode. The buffer release means can provide a holding force for holding at least one carrier in buffering mode. Preferably, the holding force is stronger than a resistance force provided by the resistance means. Hence, while the resistance means provide a resistance force against the carrier moving relative to the transfer body, the buffer release means can provide a holding force nevertheless forcing the carrier to remain stationary, or at least move at a slower pace than the transfer body. Thus, one or more carriers can be held in buffering while the transfer body keeps continuously moving.

Optionally, the buffer release means comprise input buffer release means and output buffer release means. The input buffer release means can be positioned at or near a supply conveyor. The input buffer release means can be configured to determine the timing for releasing a carrier in synchronism with supply of poultry legs by the supply conveyor. The output buffer release means can be positioned at or near a discharge conveyor. The output buffer release means can be configured to determine the timing for releasing a carrier in synchronism with passing of carriers, such as shackles, of the discharge conveyor.

Optionally, the buffer release means comprise a release wheel having one or more cam notches for engaging a first cam roller of the carrier. The buffer release means can be arranged for selectively rotating the release wheel for holding one or more carriers in the buffering mode or releasing one or more carriers to the transporting mode. In embodiments, the release wheel can be halted, or rotated at a slower pace than the transfer body to hold one or more carriers in the buffering mode. In embodiments, the release wheel can be rotated at the same or higher circumferential speed than the transfer body to release one or more carriers to the transporting mode. The release wheel can ensure spacing between the carriers. The buffer release means can be configured to synchronize a carrier with a shackle, such that the carrier is aligned with the shackle in the receiving position at or downstream the input buffer release means and/or the carrier is aligned with the shackle in the discharge position at or downstream of the output buffer release means.

Optionally, the gripper comprises one fork for holding a poultry leg. Optionally, a carcass or carcass portion having two legs is held by two carriers.

Optionally, the gripper comprises two forks for each holding a poultry leg. The gripper optionally comprises less or more than two forks.

Optionally, at least one of the forks is movable relative to the carrier. The poultry transfer unit can comprise a cam track for moving the forks via a second cam roller connected to at least one of the forks. The pitch between the grabbing portions of the forks can be adjusted by the cam track, e.g. by the shape of the cam track. Hence, the pitch of the forks can be matched to a pitch of the supply conveyor as well as to a pitch of the discharge conveyor. The pitch of the forks can be adjusted to position them in a receiving position for receiving a poultry leg.

Optionally, the poultry transfer unit is arranged for causing a velocity difference between the forks of a carrier. The velocity difference can be caused by moving one fork relative to the other while the carrier is moving. The cam track can be configured to cause a velocity difference between the forks of a carrier. By causing this velocity difference, the forks can be arranged in a receiving position for receiving a poultry leg.

According to a second aspect, a poultry transfer system is provided. The system comprises the poultry transfer unit as described and a supply conveyor. The supply conveyor can comprise one or more conveyor pushers arranged for moving along with supply shackles of the supply conveyor, and for selectively moving the poultry legs from the supply shackle into the gripper of the carrier. The supply conveyor can comprise a reversing wheel and/or a continuously rotatable wheel.

Optionally, the supply conveyor comprises a first guide for guiding the conveyor pusher to an extended position, and the supply conveyor comprises a second guide for guiding the conveyor pusher to a retracted position. The supply conveyor can be arranged such that the shape of the first guide and/or the second guide selectively determines the path of the conveyor pusher.

Optionally, the supply conveyor comprises a selector arranged to selectively move the conveyor pusher to the first guide or the second guide. The selector can selectively move the conveyor pusher in an outward or inward direction with respect to the center of the wheel. Hence, the selector allows selectively moving poultry legs, or carcasses, from the supply conveyor to the transfer unit, or selectively maintaining poultry legs, or carcasses, on the supply conveyor. Hence, different processing trajectories can be selected for different poultry legs, or carcasses.

According to a third aspect, a poultry transfer system is provided. The system comprises the poultry transfer unit as described and a discharge conveyor for moving the poultry legs from the gripper of the carrier into discharge shackles of the discharge conveyor. It will be appreciated that the poultry transfer system additionally can comprise the supply conveyor.

According to a fourth aspect, a method for transferring poultry legs from a supply conveyor to a discharge conveyor is provided. The method comprises receiving at a receiving position from the supply conveyor the poultry leg on a gripper mounted on a carrier movably mounted to a transfer body. The carrier comprises resistance means having a rotor and a stator, wherein the rotor is driven by a motion of the carrier relative to the transfer body, and wherein the stator is stationary with respect to the carrier. The method further comprises while continuously moving the transfer body, moving the carrier along with the transfer body to a discharge position in a transporting mode. The method comprises discharging the poultry leg from the gripper to the discharge conveyor. The method further comprises while continuously moving the transfer body buffering the carrier by moving the carrier relative to the transfer body in a buffering mode prior to receiving the poultry leg and/or prior to discharging the poultry leg.

Optionally, the rotor induces eddy currents in the stator and/or the stator induces eddy currents in the rotor during buffering.

Optionally, the resistance means provide a non-zero resistance between the stator and the rotor when there is no velocity difference between the at least one carrier and the transfer body.

Optionally, the resistance means include indexing means. The resistance means can be configured such that the stator and rotor move between discrete positions.

Optionally, the method further comprises controlling releasing of a carrier from buffering by buffer release means. Optionally, the method comprises selectively holding of a carrier in the buffering mode or releasing of a carrier from buffering by buffer release means. The method can comprise with the buffer release means providing a holding force for holding a carrier in buffering mode, wherein the holding force is stronger than a resistance force provided by the resistance means. The method can comprise selectively rotating a release wheel of the buffer release means for holding one or more carriers in the buffering mode or releasing one or more carriers to the transporting mode.

Optionally, the gripper comprises two forks for each holding a poultry leg, e.g., a portion of a poultry carcass.

Optionally, the method includes moving at least one of the forks relative to the carrier.

Optionally, the method includes causing a velocity difference between the forks of a carrier.

Optionally, the method includes selectively pushing the poultry legs from the supply shackle into the gripper of the carrier by one or more conveyor pushers moving along with supply shackles of the supply conveyor.

Optionally, the supply conveyor comprises a first guide for guiding the conveyor pusher to an extended position, and the supply conveyor comprises a second guide for guiding the conveyor pusher to a retracted position, the method including selectively moving the conveyor pusher to the first guide or the second guide.

It will be appreciated that any of the aspects, features and options described in view of the poultry transfer unit apply equally to the poultry transfer system and the method, and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Figure 1:
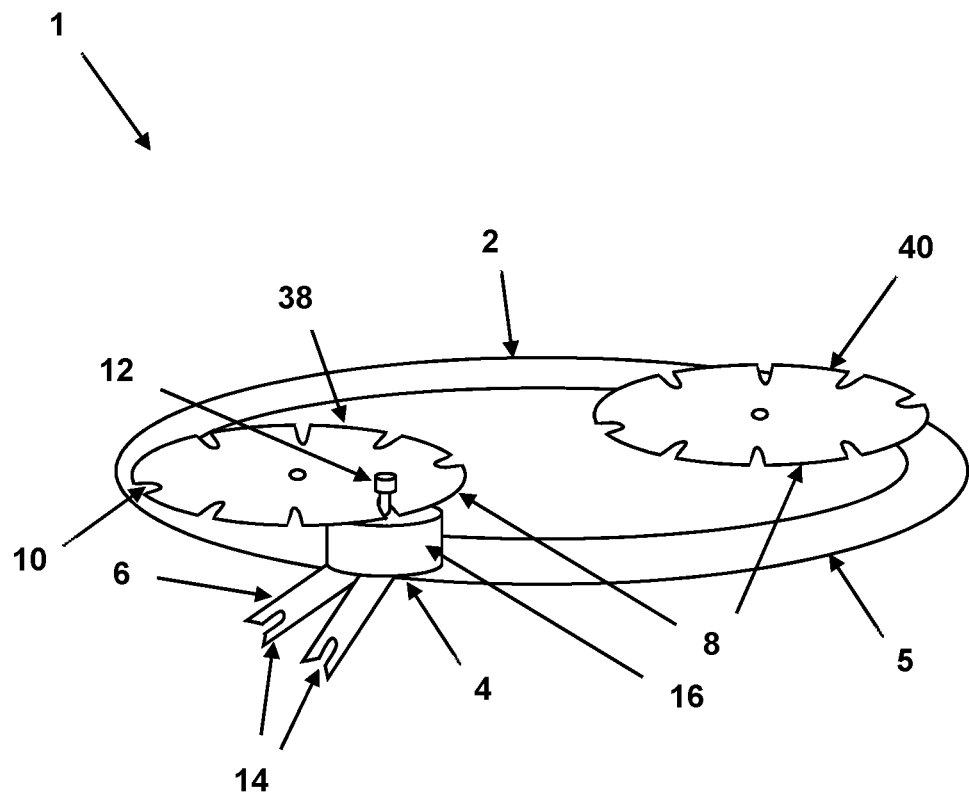
FIG. 1 shows an illustration of a schematic representation of an example of a poultry transfer unit for transferring poultry legs.

FIG. 1 shows an illustration of an example of a poultry transfer unit 1 for transferring poultry legs from a supply conveyor to a discharge conveyor. The poultry transfer unit 1 includes a transfer body 2. The transfer body 2 is configured for continuously moving. In this example, the transfer body 2 comprises a rotatable disc or annulus. The poultry transfer unit 1 includes at least one carrier 4. FIG. 1 shows only one carrier 4, but it will be appreciated that more than one carrier 4 can be included. The at least one carrier 4 is mounted to the transfer body 2. The carrier 4 is mounted to the transfer body 2 such that the at least one carrier 4 in a transporting mode moves along with the transfer body 2 and in a buffering mode moves relative to the transfer body 2. In this example, the transfer body includes an annular guide track 5 and the carrier 4 includes guide wheels (not shown but conventional) for following the guide track 5. The at least one carrier 4 comprises a gripper 6 for receiving the poultry leg. The at least one carrier 4 comprises resistance means 16 as discussed hereinbelow. The resistance means are configured to provide a resistance to relative movement of the carrier 4 and the transfer body 2.

The poultry transfer unit 1 includes buffer release means 8 for controlling releasing of a carrier 4 from buffering, e.g. from the buffering mode. In this example, the buffer release means 8 comprise input buffer release means 38 and output buffer release means 40. The buffer release means 8 comprise a release wheel having one or more cam notches 10 for engaging a first cam roller 12 of the carrier 4. Here, the gripper 6 comprises two forks 14 for each holding a poultry leg, e.g. of a carcass.

Figure 2:
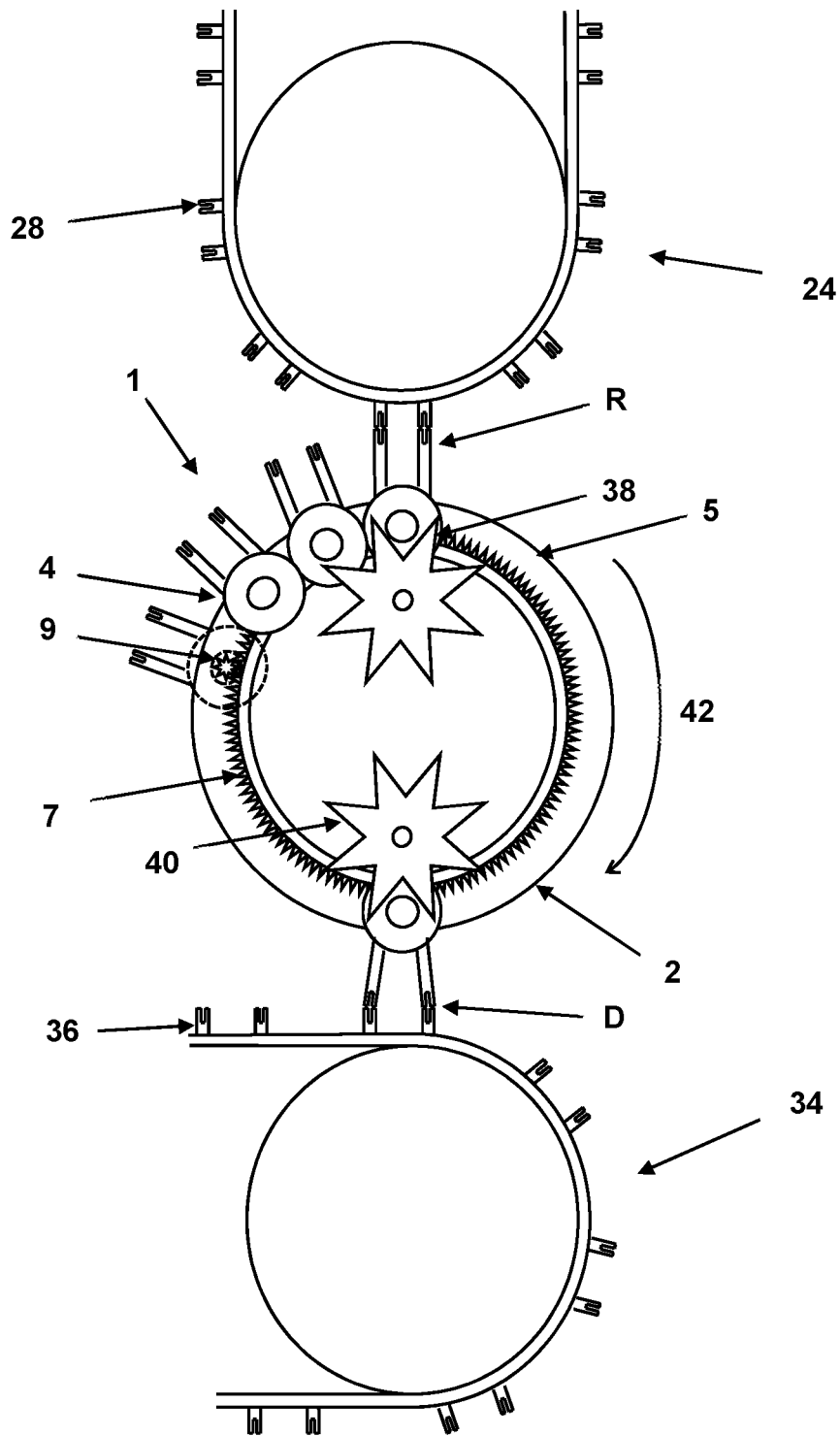
FIG. 2 shows an illustration of a schematic representation of an example of a top view of a supply conveyor, a poultry transfer unit and a discharge conveyor.

FIG. 2 shows an illustration of an example of a top view of a supply conveyor 24, a poultry transfer unit 1 and a discharge conveyor 34. The transfer body 2 comprises in this example an annular guide track 5 for guiding the carriers 4. In this example, the transfer body 2 also includes an annular sprocket 7. The annular sprocket 7 is mounted concentric with the guide track 5. Here, the annular sprocket 7 is fixedly mounted to the guide track 5. Hence, the annular sprocket 7 co-rotates with the guide track 5 when the transfer body 2 rotates. It will be appreciated that the annular sprocket 7 and the guide track 5 may also be a combined part. The carrier 4 comprises guide wheels (not shown but conventional) for following the guide track 5. In this example each carrier includes a gear 9. For clarity one of the carriers is shown partially transparent, showing the gear 9 meshing with the annular sprocket 7. Here, the input buffer release means 38 are positioned at or near the supply conveyor 24. As shown in FIG. 2, the input buffer release means 38 comprise a release wheel having one or more cam notches for engaging a first cam roller of the carrier. The input buffer release means 38 are configured to hold a first carrier in the buffer. The release wheel, e.g. when standing still or moving slowly, prevents the first carrier in the buffer from moving along with the transfer body 2. The resistance means 16 provide resistance to relative movement of the carrier 4 and the transfer body 2, but the holding force of the input buffer release means 38 is stronger than the resistance force, such that the first carrier in the buffer can be prevented from moving along with the transfer body 2 by the input buffer release means 38. As shown in FIG. 2, the first carrier in the buffer being halted by the input buffer release means also prevents the remaining carriers in the input buffer from moving along with the transfer body 2. The input buffer release means 38 are configured to determine the timing for releasing a carrier 4 in synchronism with supply of poultry legs by the supply shackles 28 of the supply conveyor 24. In the receiving position, the carrier 4 is positioned at or near the supply conveyor 24. In this example, the input buffer release means 38 are configured to release the carrier 4 during receiving poultry legs by the carrier 4 in the receiving position R. Once a carrier is to be released from the input buffer, the input buffer release means 38 can release the first carrier from the input buffer. Thereto, the release wheel can be rotated to release the first carrier in the input buffer from the associated cam notch 10. The resistance means 16 then provide a resistance to relative movement of the carrier 4 and the transfer body 2, such that the carrier is in the transporting mode and moves along with the transfer body 2. The transfer unit 1 is arranged to move the released carrier 4 in direction 42, along with rotation of the transfer body 2, from the receiving position R to the discharge position D.

In this example, the output buffer release means 40 are positioned at or near the discharge conveyor 34. As shown in FIG. 2, the output buffer release means 40 comprise a release wheel having one or more cam notches for engaging a first cam roller of the carrier. The output buffer release means 40 are configured to hold a first carrier in the buffer. In embodiments, the release wheel, e.g., when standing still or moving slowly, prevents the first carrier in the buffer from moving along with the transfer body 2. The resistance means 16 provide resistance to relative movement of the carrier 4 and the transfer body 2, but the holding force of the output buffer release means 40 is stronger than the resistance force, such that the first carrier in the buffer can be prevented from moving along with the transfer body 2 by the output buffer release means 40. The first carrier in the buffer being halted by the output buffer release means can also prevent remaining carriers in the output buffer from moving along with the transfer body 2. The output buffer release means 40 are configured to determine the timing for releasing a carrier 4 in synchronism with passing of carriers, such as discharge shackles 36, of the discharge conveyor 34. In the discharge position D, the carrier 4 is positioned at or near the discharge conveyor 34. In this example, the output buffer release means 40 are configured to release the carrier 4 during discharging poultry legs by the carrier 4 in the discharge position D. Once a carrier is to be released from the output buffer, the output buffer release means 40 can release the first carrier from the output buffer. Thereto, the release wheel can be rotated to release the first carrier in the output buffer from the associated cam notch 10. The resistance means 16 then provide a resistance to relative movement of the carrier 4 and the transfer body 2, such that the carrier is in the transporting mode and moves along with the transfer body 2. The transfer unit 1 is arranged to move the released carrier 4 in direction 42, along with the transfer body 2, from the discharge position D to the receiving position R. The transfer unit 1 is arranged to buffer the carrier 4, e.g., move the carrier 4 relative to the transfer body 2, in a position prior to receiving the poultry leg and/or prior to discharging the poultry leg. In case more than one carrier is included, the transfer unit 1 can be arranged to hold multiple carriers in the buffering mode or transporting mode at once. Hence, the transfer unit 1 in this example ensures different positioning or velocity or a different spacing between poultry parts suiting different handling of poultry in the supply conveyor 24 and/or discharge conveyor 34.

Figure 3:
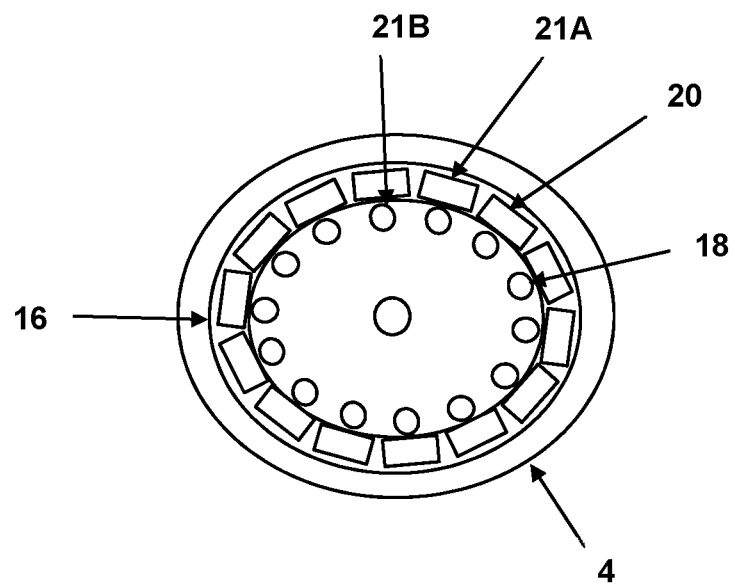
FIG. 3 shows an illustration of a schematic representation of an example of a bottom view of a carrier.

FIG. 3 shows an illustration of an example of a cross sectional view of a carrier 4. The carrier 4 comprises resistance means 16. Here, the resistance means 16 include a rotor 18 and a stator 20. The rotor 18 is in this example driven by a motion of the carrier 4 relative to the transfer body 2, and the stator 20 is stationary with respect to the carrier 4. Here, the transfer body 2 comprises the sprocket 7 and the carrier 4 comprises the gear 9 arranged to engage the sprocket 7, such that the gear drives the rotor 18. The gear 9 is mounted to the rotor 18. The rotor 18 is in this example arranged to induce eddy currents in the stator 20 and/or the stator 20 is arranged to induce eddy currents in the rotor 18 in the buffering mode. The resistance means 16 are configured to provide a non-zero resistance between stator 20 and rotor 18 when there is no velocity difference between the at least one carrier 4 and the transfer body 2, e.g. in the transporting mode. Here, the stator 20 and the rotor 18 comprise complementary magnetic means 21A, 21B. The resistance means 16 can include indexing means. The indexing means can be configured such that stator and rotor move between predetermined rotational positions. Preferably, one of the stator 20 and rotor 18 has permanent magnets, whereas the other one comprises a magnetizable material. In this example, the stator 20 comprises permanent magnets 21A. In this example, the rotor 18 is made of aluminum. In this example, the magnetizable material is in the form of inserts 201B, such as pins, in the rotor 18. The number of pins is equal to the number of magnets, such as 8, 12, 16, 20, 24 or 30 magnets. This ensures a predetermined number of available relative index positions between stator 20 and rotor 18.

Figure 4:
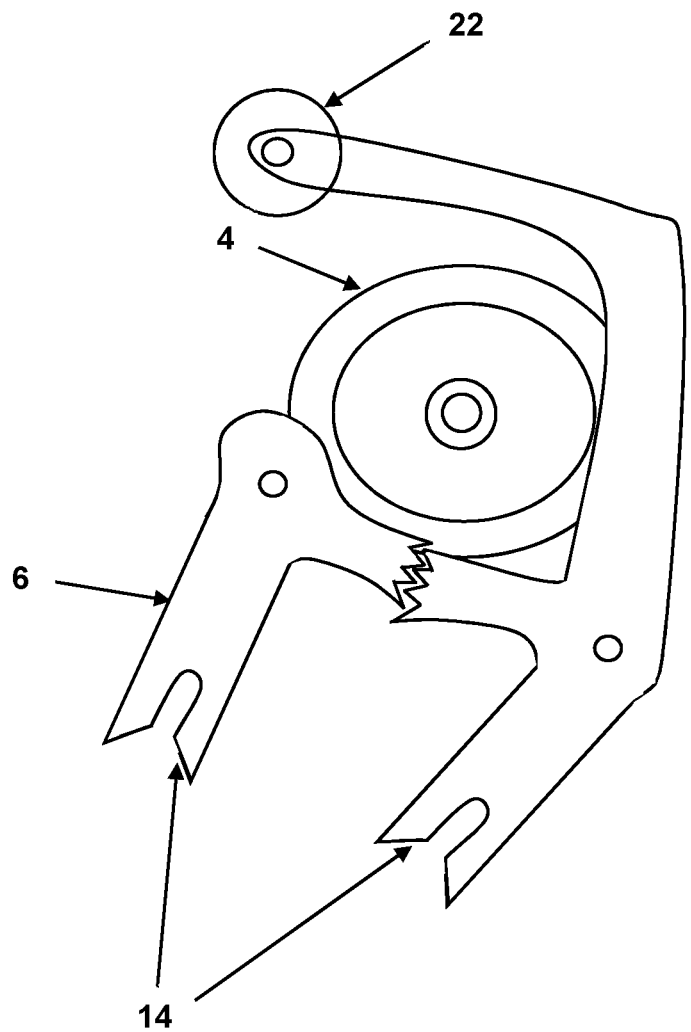
FIG. 4 shows an illustration of a schematic representation of an example of a top view of a carrier.

FIG. 4 shows an illustration of an example of a bottom view of a carrier 4. The gripper 6 has two forks 14 for each holding a poultry leg. At least one of the forks 14 is movable relative to the carrier 4. In this example, both forks 14 are movable, more specifically rotatable, relative to the carrier. The poultry transfer unit 1 comprises a cam track for moving the forks 14 via a second cam roller 22 connected to at least one of the forks 4. The pitch between the grabbing portions of the forks 4 can be configured with the cam track. Hence, the pitch of the forks 14 can be matched to a pitch of supply shackles 28 and discharge shackles 36, even if those pitches differ. The poultry transfer unit 1 can also be arranged for causing a velocity difference between the forks 14 of a carrier 4 at the receiving position R or the discharge position D.

Figure 5:
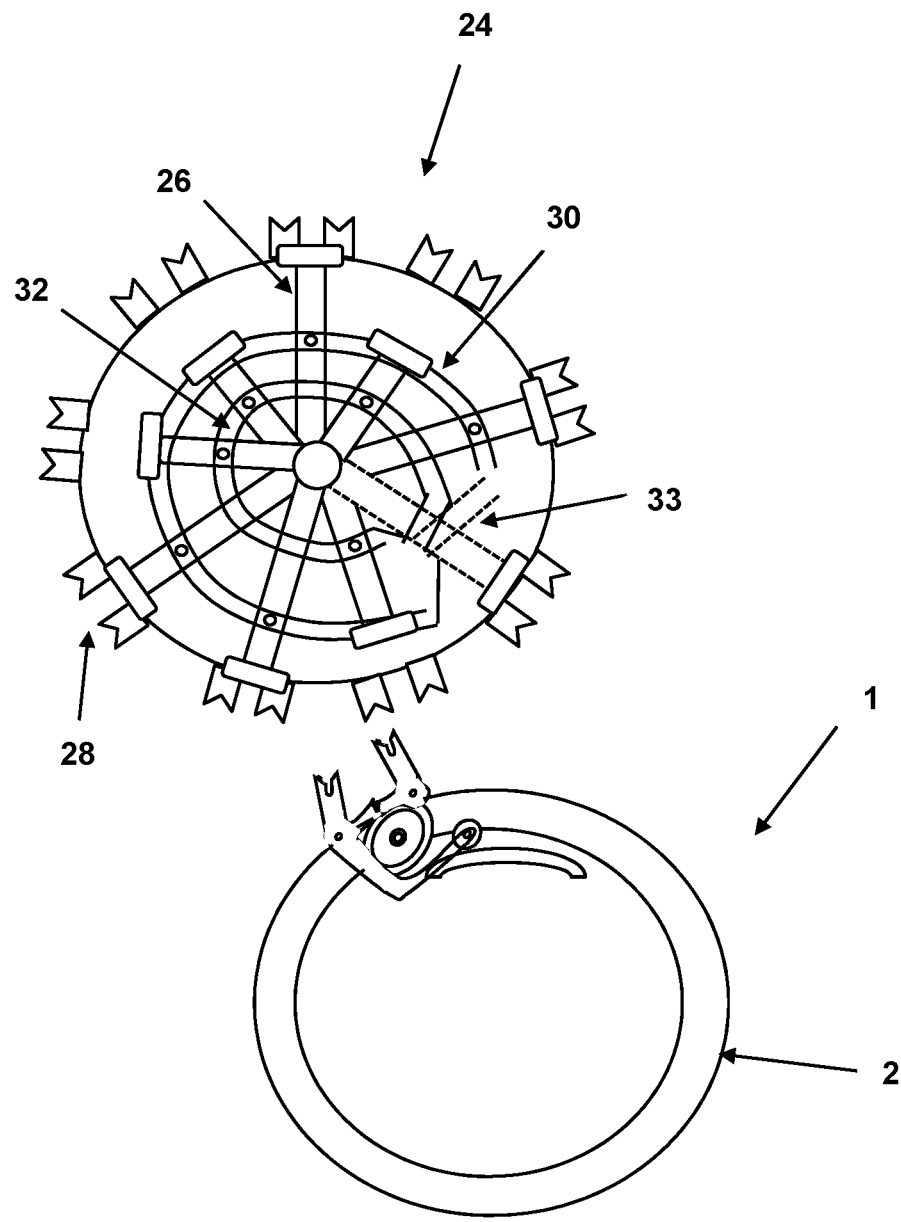
FIG. 5 shows an illustration of a schematic representation of an example of a bottom view of a poultry transfer system comprising a poultry transfer unit and a supply conveyor.

FIG. 5 shows an illustration of an example of a bottom view of a poultry transfer system comprising a poultry transfer unit 1 and a supply conveyor 24. The supply conveyor 24 comprises one or more conveyor pushers 26 arranged for moving along with supply shackles 28 of the supply conveyor 24, and for selectively moving the poultry legs from the supply shackle 28 into the gripper 6 of the carrier 4. Here, the supply conveyor 24 comprises a first guide 30 for guiding the conveyor pusher 26 to an extended position and a second guide 32 for guiding the conveyor pusher 26 to a retracted position. The supply conveyor 24 in this example comprises a selector 33 arranged to selectively have the conveyor pusher 26 follow the first guide 30 or the second guide 32.

Figure 6:
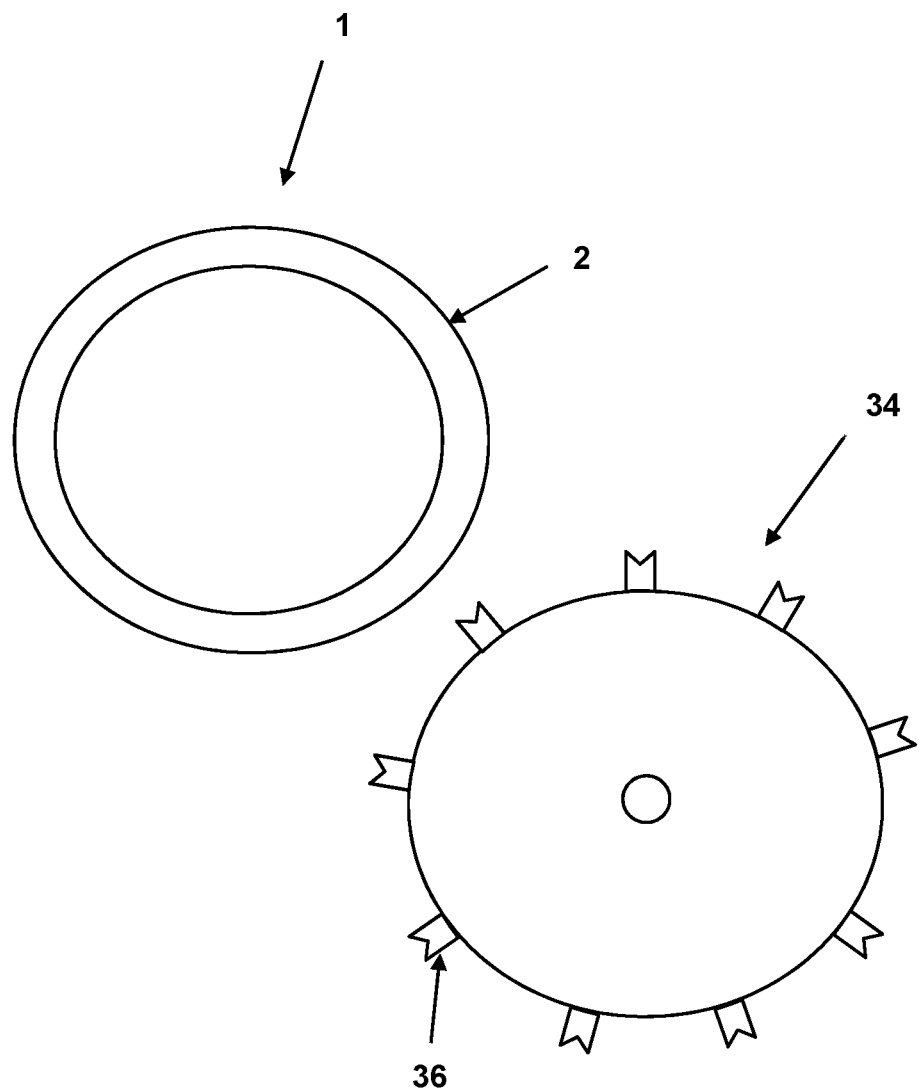
FIG. 6 shows an illustration of a schematic representation of an example of a bottom view of a poultry transfer system comprising a poultry transfer unit and a discharge conveyor.

FIG. 6 shows an illustration of an example of a bottom view of a poultry transfer system comprising a poultry transfer unit 1 and a discharge conveyor 34. The poultry transfer system is arranged for moving the poultry legs from the gripper 6 of the carrier 4 into discharge shackles 36 of the discharge conveyor 34.

Figure 7:
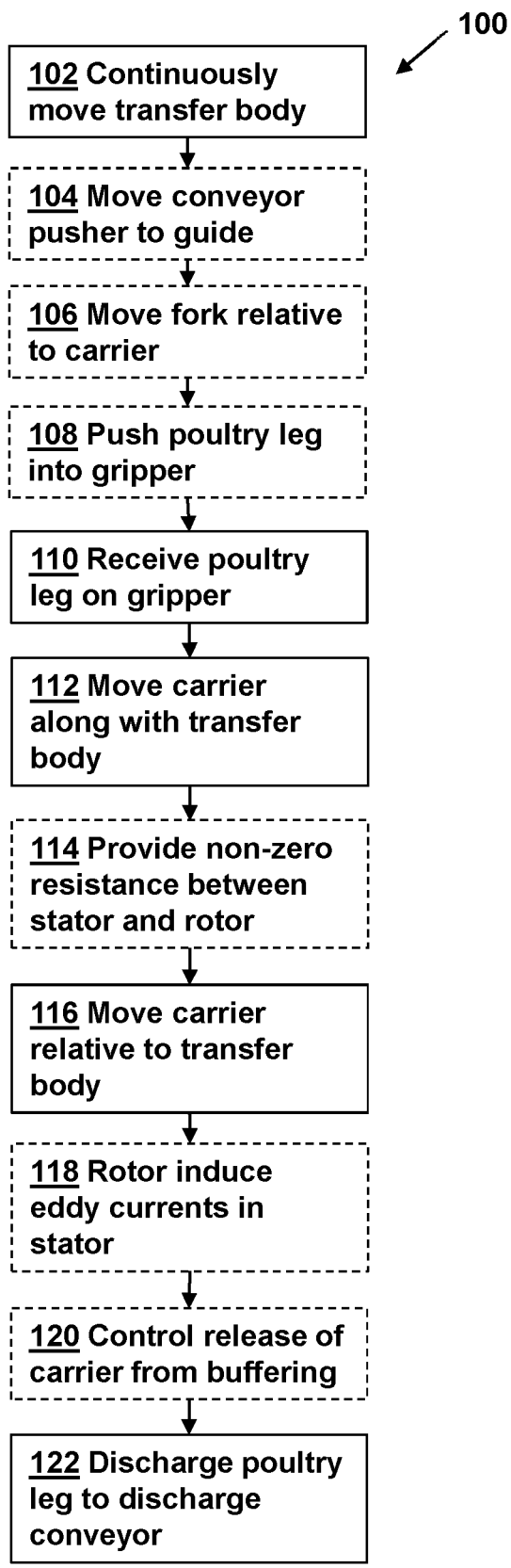
FIG. 7 shows an example of a flow chart of a method for transferring poultry legs from a supply conveyor to a discharge conveyor.

FIG. 7 shows a flow chart of an example of a method 100 for transferring poultry legs from a supply conveyor 24 to a discharge conveyor 34. Optional steps are shown in dashed boxes. In a first step 102 the transfer body 2 is continuously moved. Here, the step 102 is performed in parallel with the other steps. The supply conveyor 24 can comprise a first guide 30 for guiding the conveyor pusher 26 to an extended position, and a second guide 32 for guiding the conveyor pusher 26 to a retracted position. The method 100 can include selectively moving the conveyor pusher 26 to the first guide 30 or the second guide 32 in step 104. In step 106 at least one of the forks 14 of the gripper 6 can be moved relative to the carrier 4. A velocity difference can be caused between the forks 14 of the carrier 4. The step 106 can be performed in parallel with step 104. In step 108 the poultry legs can be selectively pushed from the supply shackle 28 into the gripper 6 of the carrier 4, e.g. by one or more conveyor pushers 26 moving along with supply shackles 28 of the supply conveyor 24. Movement of the respective carrier in synchronism with the respective supply shackle can be guided by the input buffer release means 38. The step 108 can be performed after steps 104 and 106.

The poultry leg is received on a gripper 6 mounted on a carrier 4 that is movably mounted to a transfer body 2, at a receiving position from the supply conveyor 24 in step 110. The step 110 can be performed after and/or during step 108. In step 112 the carrier 4 is moved along with the transfer body 2 to the discharge position D in a transporting mode. The step 112 can be performed prior to, during and/or after step 110. The carrier 4 in this example comprises resistance means 8 having a rotor 18 and a stator 20. The resistance means generate a resistance due to a velocity difference between the transfer body and the carrier. The resistance during buffering of the carrier is chosen such that the transfer body can continue continuous motion and the carrier can be maintained in place. The rotor 18 is in this example driven by a motion of the carrier 4 relative to the transfer body 2, and the stator 20 is stationary with respect to the carrier 4. The resistance causes the carrier to move along with the transfer body once released by the buffer release means. The resistance means 16 can provide a non-zero resistance between stator 20 and rotor 18 in step 114 when there is no velocity difference between the at least one carrier 4 and the transfer body 2, e.g. in the transporting mode. This may aid in having the carrier continue to move along with the transfer body once the velocity difference between the carrier and the transfer body is gone. The step 114 can be performed prior to, during and/or after step 112. The carrier 4 is moved relative to the transfer body 2, e.g., buffered, in a buffering mode in step 116 prior to receiving the poultry leg and/or prior to discharging the poultry leg. The step 116 can be performed prior to step 110 and/or prior to step 122. The rotor 18 can induce eddy currents in the stator 20 and/or the stator 20 can induce eddy currents in the rotor 18 in the buffering mode in step 118. The step 118 can be performed during step 116. In step 120 the buffer release means 8 optionally control releasing of a carrier from buffering. The step 120 can be performed during and/or after step 116. The method 100 comprises discharging the poultry leg from the gripper 6 to the discharge conveyor 34 in step 122. The step 122 can be performed after step 112 and/or after step 116.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the resistance means generate a resistance based on magnetic forces. It will be appreciated that alternative resistance means can be used, e.g. using liquid viscosity, mechanical resistance or the like. In the examples, the transfer body comprises an annular guide track for guiding the carriers and an annular sprocket. In the examples, the annular sprocket is fixedly mounted to the guide track so that the annular sprocket co-rotates with the guide track when the transfer body rotates. It will be appreciated that it is also possible that the guide track and the annular sprocket rotate at mutually different speeds. It is also possible that the guide track is stationary and the annular sprocket rotates. In that case, the transfer body comprises the annular sprocket. In the examples the rotor is driven by an annular sprocket and gear. It will be appreciated that the rotor can be driven in alternative ways such as via a friction wheel, magnetic drive, or the like.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one,' but instead are used to mean 'at least one,' and do not exclude a plurality. The mere fact that certain measures are recited in mutually different claims does not indicate that a combination of these measures cannot be used to an advantage.

The invention claimed is:

1. A poultry transfer unit for transferring poultry legs from a supply conveyor to a discharge conveyor, the poultry transfer unit comprising:
   a transfer body; and
   at least one carrier engaging the transfer body such that, in a transporting mode, the at least one carrier moves along with the transfer body, and in a buffering mode moves relative to the transfer body, the at least one carrier comprising a gripper for receiving one poultry leg;
   wherein the at least one carrier comprises a resistance means including a rotor and a stator, wherein the rotor is driven by a motion of the at least one carrier relative to the transfer body, and wherein the stator is stationary with respect to the at least one carrier.

2. The poultry transfer unit according to claim 1, wherein the transfer body comprises a sprocket and the at least one carrier comprises a gear arranged to engage the sprocket, wherein the gear drives the rotor.

3. The poultry transfer unit according to claim 1, wherein the rotor is configured to induce eddy currents in the stator and/or the stator is configured to induce eddy currents in the rotor in the buffering mode.

4. The poultry transfer unit according to claim 1, wherein the resistance means are configured to provide a non-zero resistance between stator and rotor when there is no velocity difference between the at least one carrier and the transfer body.

5. The poultry transfer unit according to claim 1, wherein the stator and the rotor comprise complementary magnetic means.

6. The poultry transfer unit according to claim 1, wherein the stator comprises at least one permanent magnet and the rotor comprises aluminum.

7. The poultry transfer unit according to claim 1, further comprising a buffer release means for controlling releasing of the at least one carrier from the buffering mode.

8. The poultry transfer unit according to claim 7, wherein the buffer release means is configured for selectively holding the at least one carrier in the buffering mode or releasing the at least one carrier to the transporting mode.

9. The poultry transfer unit according to claim 8, wherein the buffer release means is configured to provide a holding force for holding the at least one carrier in the buffering mode, wherein the holding force is stronger than a resistance force provided by the resistance means.

10. The poultry transfer unit according to claim 7, wherein the buffer release means comprises an input buffer release means and an output buffer release means.

11. The poultry transfer unit according claim 7, wherein the buffer release means comprises a release wheel having one or more cam notches for engaging a first cam roller of the at least one carrier.

12. The poultry transfer unit according to claim 11, wherein the release wheel is configured to be selectively rotated for holding the at least one carrier in the buffering mode or releasing the at least one carrier to the transporting mode.

13. The poultry transfer unit according to claim 1, wherein the gripper comprises two forks configured to hold a poultry leg.

14. The poultry transfer unit according to claim 13, wherein at least one fork is movable relative to the at least one carrier, and wherein the poultry transfer unit further comprises a cam track for moving the at least one fork via a second cam roller connected to the at least one of the forks.

15. The poultry transfer unit according to claim 14, wherein the cam track is configured for causing a velocity difference between movement of the forks of the at least one carrier.

16. A poultry transfer system comprising:
   a supply conveyor configured to transport a plurality of poultry legs; and
   a poultry transfer unit configured to receive the poultry legs from the supply conveyor, the poultry transfer unit comprising:
      a transfer body; and
      at least one carrier engaging the transfer body and configured, such that in a transporting mode the at least one carrier moves along with the transfer body, and in a buffering mode the at least one carrier moves relative to the transfer body, the at least one carrier comprising a gripper configured for receiving one poultry leg;
   wherein the at least one carrier comprises a resistance means including a rotor and a stator, wherein the rotor is driven by a motion of the at least one carrier relative to the transfer body;
   wherein the stator is stationary with respect to the at least one carrier; and
   wherein the supply conveyor comprises one or more conveyor pushers adapted to move with supply shackles of the supply conveyor, and configured for selectively moving the poultry legs from the supply shackle into the gripper of the at least one carrier.

17. The poultry transfer system according to claim 16, wherein the supply conveyor comprises a first guide for guiding each conveyor pusher to an extended position, and a second guide for guiding each conveyor pusher to a retracted position.

18. The poultry transfer system according to claim 17, wherein the supply conveyor comprises a selector configured to selectively move the conveyor pusher to the first guide or the second guide.

19. The poultry transfer system according to claim 16, further comprising a discharge conveyor for moving the poultry legs from the gripper of the at least one carrier into discharge shackles of the discharge conveyor.

20. A method for transferring poultry legs from a supply conveyor to a discharge conveyor, the method comprising:
   receiving a poultry leg from the supply conveyor on a gripper mounted on a carrier movably engaging to a transfer body, wherein the carrier comprises:
      a rotor and a stator;
      wherein the rotor is driven by a motion of the carrier relative to the transfer body; and
      wherein the stator is stationary with respect to the carrier;
   moving the transfer body in a transporting mode, and moving the carrier to a discharge position;
   discharging the poultry leg from the gripper to the discharge conveyor; and
   while moving the transfer body, buffering the carrier by moving the carrier relative to the transfer body in a buffering mode prior to receiving the poultry leg and/or prior to discharging the poultry leg.

* * * * *